United States Patent
Wang et al.

(10) Patent No.: US 10,452,696 B2
(45) Date of Patent: Oct. 22, 2019

(54) METHOD AND APPARATUS FOR COMPUTING SIMILARITY BETWEEN CROSS-FIELD DOCUMENTS

(71) Applicant: Huawei Technologies Co., Ltd., Shenzhen (CN)

(72) Inventors: Liangwei Wang, Shenzhen (CN); Wing Ki Leung, Shenzhen (CN); Yang Yang, Beijing (CN)

(73) Assignee: HAUWEI TECHNOLOGIES CO., LTD., Shenzhen (CN)

( * ) Notice: Subject to any disclaimer, the term of this patent is extended or adjusted under 35 U.S.C. 154(b) by 413 days.

(21) Appl. No.: 15/190,985

(22) Filed: Jun. 23, 2016

(65) Prior Publication Data

US 2016/0306873 A1    Oct. 20, 2016

Related U.S. Application Data

(63) Continuation of application No. PCT/CN2014/082526, filed on Jul. 18, 2014.

(30) Foreign Application Priority Data

Dec. 24, 2013    (CN) .......................... 2013 1 0722866

(51) Int. Cl.
*G06F 16/35*    (2019.01)
*G06F 16/93*    (2019.01)
(Continued)

(52) U.S. Cl.
CPC ............ *G06F 16/334* (2019.01); *G06F 16/33* (2019.01); *G06F 16/3334* (2019.01);
(Continued)

(58) Field of Classification Search
None
See application file for complete search history.

(56) References Cited

U.S. PATENT DOCUMENTS

| 6,542,889 B1 | 4/2003 | Aggarwal et al. |
| 7,260,570 B2 | 8/2007 | Brown et al. |

(Continued)

FOREIGN PATENT DOCUMENTS

| CN | 101441620 A | 5/2009 |
| CN | 103207899 A | 7/2013 |

(Continued)

OTHER PUBLICATIONS

Foreign Communication From a Counterpart Application, Chinese Application No. 201310722866.9, Chinese Office Action dated Jul. 12, 2017, 5 pages.

(Continued)

*Primary Examiner* — Arpan P. Savla
*Assistant Examiner* — Soheila (Gina) Davanlou
(74) *Attorney, Agent, or Firm* — Conley Rose, P.C.

(57) ABSTRACT

A method includes storing documents of different fields, and a relationship between any two documents of different fields, performing word segmentation and stop word removal on the documents of different fields, to obtain a vocabulary data set for the documents of different fields, constructing an incidence matrix between the documents of different fields according to the relationship between the any two documents of different fields, obtaining a topic cluster of the documents of different fields according to the vocabulary data set, obtaining a probability that any topic in the topic cluster appears in any document and a matching weight of the any topic for any two different fields according to the incidence matrix and the topic cluster, and computing a similarity between the any two documents according to the probabilities and the matching weight of the any topic for the fields to which the any two documents belong.

15 Claims, 4 Drawing Sheets

(51) Int. Cl.
  *G06F 16/33* (2019.01)
  *G06F 16/36* (2019.01)
(52) U.S. Cl.
  CPC .............. *G06F 16/35* (2019.01); *G06F 16/36* (2019.01); *G06F 16/367* (2019.01); *G06F 16/93* (2019.01)

(56) References Cited

U.S. PATENT DOCUMENTS

| | | | | |
|---|---|---|---|---|
| 2004/0111438 | A1* | 6/2004 | Chitrapura | G06F 17/30 |
| 2008/0114750 | A1 | 5/2008 | Saxena et al. | |
| 2011/0078585 | A1* | 3/2011 | King | G06F 17/30011 715/751 |
| 2012/0296637 | A1 | 11/2012 | Smiley et al. | |
| 2013/0046785 | A1* | 2/2013 | Assadollahi | G06F 17/30011 707/776 |
| 2014/0207783 | A1* | 7/2014 | Ravid | G06F 17/30604 707/739 |
| 2015/0052564 | A1* | 2/2015 | Glowaty | G06F 17/30817 725/53 |

FOREIGN PATENT DOCUMENTS

| | | |
|---|---|---|
| CN | 103324640 A | 9/2013 |
| CN | 103377239 A | 10/2013 |
| GB | 2365569 A | 2/2002 |
| JP | 2013191194 A | 9/2013 |

OTHER PUBLICATIONS

Partial English Translation and Abstract of Chinese Patent Application No. CN101441620, Nov. 22, 2016, 16 pages.
Wang, Z., et al., "Cross-lingual Knowledge Linking Across Wiki Knowledge Bases," Proceedings of the 21st International Conference on World Wide Web, Apr. 16-20, 2012, 10 pages.
Blei, D., et al., "Latent Dirichlet Allocation," Journal of Machine Learning Research 3, 2003, pp. 993-1022.
Foreign Communication From a Counterpart Application, European Application No. 14874314.9, Extended European Search Report dated Sep. 13, 2016, 13 pages.
Foreign Communication From a Counterpart Application, PCT Application No. PCT/CN2014/082526, English Translation of International Search Report dated Apr. 20, 2015, 2 pages.
Foreign Communication From a Counterpart Application, PCT Application No. PCT/CN2014/082526, English Translation of Written Opinion dated Apr. 20, 2015, 6 pages.

\* cited by examiner

METHOD AND APPARATUS FOR COMPUTING SIMILARITY BETWEEN CROSS-FIELD DOCUMENTS

CROSS-REFERENCE TO RELATED APPLICATIONS

This application is a continuation of International Application No. PCT/CN2014/082526, filed on Jul. 18, 2014, which claims priority to Chinese Patent Application No. 201310722866.9, filed on Dec. 24, 2013, both of which are hereby incorporated by reference in their entireties.

TECHNICAL FIELD

The present disclosure relates to the field of communications technologies, and in particular, to a method and an apparatus for computing a similarity between cross-field documents.

BACKGROUND

Sometimes, when retrieving a document, a user needs to retrieve documents of another field that match the document. At present, there are mainly two manners of matching cross-field documents. A first manner is performing matching between documents of different fields according to a similarity between text character strings of sentences in the documents of different fields, and a second manner is counting a similarity between vocabularies in documents of different fields, and performing matching between the documents of different fields according to a similarity of words in the documents of different fields.

In the first manner, sentences describing a same thing in different documents are not necessarily the same, and sentences describing a same thing in documents of different fields are far more different. Therefore, matching between cross-field documents according to a similarity between character strings cannot be performed accurately. In the second manner, matching between documents of different fields is performed according to a counted similarity between vocabularies in the documents of different fields, but words used to describe a same thing in the documents of different fields are quite different. Therefore, documents cannot be accurately matched merely according to the similarity between the vocabularies.

SUMMARY

Embodiments of the present disclosure disclose a method and an apparatus for computing a similarity between cross-field documents, which are used to improve accuracy of the similarity between cross-field documents in order to improve accuracy of matching between the cross-field documents according to the similarity.

A first aspect of the embodiments of the present disclosure provides a method for computing a similarity between cross-field documents, including storing documents of different fields, and storing a relationship between any two documents of different fields, where the relationship between the any two documents of different fields is used to describe a determined matching relationship or an undetermined matching relationship between the any two documents, where the determined matching relationship includes a known matching relationship or a known non-matching relationship, performing word segmentation and stop word removal on the documents of different fields, to obtain a vocabulary data set for the documents of different fields, constructing an incidence matrix between the documents of different fields according to the relationship between the any two documents of different fields, obtaining a topic cluster of the documents of different fields according to the vocabulary data set, obtaining a probability that any topic in the topic cluster appears in any document and a matching weight of the any topic for any two different fields according to the incidence matrix and the topic cluster, and computing a similarity between the any two documents according to probabilities that the any topic in the topic cluster appears in the any two documents of different fields and the matching weight of the any topic for the fields to which the any two documents belong.

In a first possible implementation manner of the first aspect of the embodiments of the present disclosure, performing word segmentation and stop word removal on the documents of different fields, to obtain a vocabulary data set for the documents of different fields includes performing word segmentation and stop word removal on the documents of different fields, to obtain vocabulary data packages corresponding to the documents of different fields, and storing together the vocabulary data packages, to obtain the vocabulary data set for the documents of different fields.

In a second possible implementation manner of the first aspect of the embodiments of the present disclosure, computing a similarity between the any two documents according to probabilities that the any topic in the topic cluster appears in the any two documents of different fields and the matching weight of the any topic for the fields to which the any two documents belong includes multiplying the probabilities that the any topic in the topic cluster appears in the any two documents of different fields, to obtain a probability product, multiplying the probability product by the matching weight of the any topic for the fields to which the any two documents belong, to obtain the similarity between the any two documents with respect to the any topic, adding up similarities between the any two documents with respect to topics in the topic cluster, to obtain an initial similarity between the any two documents, and performing normalization processing on the initial similarity between the any two documents, to obtain the similarity between the any two documents.

With reference to the first aspect of the embodiments of the present disclosure or the first possible implementation manner of the first aspect of the embodiments of the present disclosure, in a third possible implementation manner of the first aspect of the embodiments of the present disclosure, after computing a similarity between the any two documents according to probabilities that the any topic in the topic cluster appears in the any two documents of different fields and the matching weight of the any topic for the fields to which the any two documents belong, the method further includes performing similarity sorting on similarities between the any document and corresponding documents according to the similarities in descending order, where a field of the corresponding documents is different from that of the any document, selecting, starting from the highest similarity in the similarity sorting list, a similarity greater than or equal to a preset threshold as a similarity between the any document and the corresponding documents matching the any document, and storing the selected similarity to a list of similarities between the any document and the corresponding documents matching the any document.

With reference to the third possible implementation manner of the first aspect of the embodiments of the present disclosure, in a fourth possible implementation manner of the first aspect of the embodiments of the present disclosure, after storing the selected similarity to a list of similarities between the any document and the corresponding documents matching the any document, the method further includes detecting a to-be-retrieved document input by a user, determining whether the to-be-retrieved document is within the documents of different fields, querying the stored list of similarities for a list of similarities between the to-be-retrieved document and corresponding documents matching the to-be-retrieved document if the to-be-retrieved document is within the documents of different fields, and outputting, according to the list of similarities between the to-be-retrieved document and the corresponding documents matching the to-be-retrieved document, a document list of the corresponding documents matching the to-be-retrieved document.

With reference to the fourth possible implementation manner of the first aspect of the embodiments of the present disclosure, in a fifth possible implementation manner of the first aspect of the embodiments of the present disclosure, the method further includes counting a probability that a word related to the any topic in the topic cluster appears in the to-be-retrieved document if the to-be-retrieved document is not within the documents of different fields, computing, according to the probability that the word related to the any topic appears, a probability that the any topic appears in the to-be-retrieved document, and computing a similarity between the to-be-retrieved document and any corresponding document according to the probability that the any topic appears in the to-be-retrieved document, a probability that the any topic appears in the any corresponding document, and a matching weight of the any topic for a field to which the to-be-retrieved document belongs and for a field to which the any corresponding document belongs.

With reference to the fifth possible implementation manner of the first aspect of the embodiments of the present disclosure, in a sixth possible implementation manner of the first aspect of the embodiments of the present disclosure, after computing a similarity between the to-be-retrieved document and any corresponding document according to the probability that the any topic appears in the to-be-retrieved document, a probability that the any topic appears in the any corresponding document, and a matching weight of the any topic for a field to which the to-be-retrieved document belongs and for a field to which the any corresponding document belongs, the method further includes performing similarity sorting on similarities between the to-be-retrieved document and the corresponding documents according to the similarities in descending order, selecting, starting from the highest similarity in the similarity sorting list, a similarity greater than or equal to a preset threshold as a similarity between the to-be-retrieved document and the corresponding documents matching the to-be-retrieved document, and storing the selected similarity to the list of similarities between the to-be-retrieved document and the corresponding documents matching the to-be-retrieved document, and outputting, according to the list of similarities between the to-be-retrieved document and the corresponding documents matching the to-be-retrieved document, a document list of the corresponding documents matching the to-be-retrieved document.

A second aspect of the embodiments of the present disclosure provides an apparatus for computing a similarity between cross-field documents, including a first storing unit configured to store documents of different fields, and store a relationship between any two documents of different fields, where the relationship between the any two documents of different fields is used to describe a determined matching relationship or an undetermined matching relationship between the any two documents, where the determined matching relationship includes a known matching relationship or a known non-matching relationship, a processing unit configured to perform word segmentation and stop word removal on the documents of different fields stored by the first storing unit, to obtain a vocabulary data set for the documents of different fields, a constructing unit configured to construct an incidence matrix between the documents of different fields according to the relationship, stored by the first storing unit, between the any two documents of different fields, a first obtaining unit configured to obtain a topic cluster of the documents of different fields according to the vocabulary data set obtained by the processing unit, a second obtaining unit configured to obtain a probability that any topic in the topic cluster appears in any document and a matching weight of the any topic for any two different fields according to the incidence matrix constructed by the constructing unit and the topic cluster obtained by the first obtaining unit, and a first computing unit configured to compute a similarity between the any two documents according to probabilities that the any topic in the topic cluster appears in the any two documents of different fields and the matching weight of the any topic for the fields to which the any two documents belong, where the probabilities and the weight are obtained by the second obtaining unit.

In a first possible implementation manner of the second aspect of the embodiments of the present disclosure, the processing unit includes a processing subunit configured to perform word segmentation and stop word removal on the documents of different fields stored by the first storing unit, to obtain vocabulary data packages corresponding to the documents of different fields, and a storing subunit configured to store together the vocabulary data packages obtained by the processing subunit, to obtain the vocabulary data set for the documents of different fields.

In a second possible implementation manner of the second aspect of the embodiments of the present disclosure, the first computing unit includes a first multiplication subunit configured to multiply the probabilities that the any topic in the topic cluster appears in the any two documents of different fields and that are obtained by the second obtaining unit, to obtain a probability product, a second multiplication subunit configured to multiply the probability product by the matching weight of the any topic for the fields to which the any two documents belong, to obtain the similarity between the any two documents with respect to the any topic, where the probability product is obtained by the first multiplication subunit, and the weight is obtained by the second obtaining unit, an add-up subunit configured to add up similarities, obtained by the second multiplication subunit, between the any two documents with respect to topics in the topic cluster, to obtain an initial similarity between the any two documents, and a normalizing subunit configured to perform normalization processing on the initial similarity between the any two documents obtained by the add-up subunit, to obtain the similarity between the any two documents.

With reference to the second aspect of the embodiments of the present disclosure or the first possible implementation manner of the second aspect of the embodiments of the present disclosure, in a third possible implementation manner of the second aspect of the embodiments of the present disclosure, the apparatus further includes a first sorting unit configured to perform similarity sorting on similarities, computed by the first computing unit, between the any document and corresponding documents according to the similarities in descending order, where a field of the corresponding documents is different from that of the any document, a first selecting unit configured to select, starting from the highest similarity in the similarity sorting list sorted by the first sorting unit, a similarity greater than or equal to a preset threshold as a similarity between the any document and the corresponding documents matching the any document, and a second storing unit configured to store the similarity selected by the first selecting unit, to a list of similarities between the any document and the corresponding documents matching the any document.

With reference to the third possible implementation manner of the second aspect of the embodiments of the present disclosure, in a fourth possible implementation manner of the second aspect of the embodiments of the present disclosure, the apparatus further includes a detecting unit configured to detect a to-be-retrieved document input by a user, a determining unit configured to determine whether, a querying unit configured to query the list of similarities, stored by the second storing unit, for a list of similarities between the to-be-retrieved document and corresponding documents matching the to-be-retrieved document when the to-be-retrieved document detected by the detecting unit is within the documents of different fields stored by the first storing unit, and a first output unit configured to output, according to the list of similarities, queried by the querying unit, between the to-be-retrieved document and the corresponding documents matching the to-be-retrieved document, a document list of the corresponding documents matching the to-be-retrieved document.

With reference to the fourth possible implementation manner of the second aspect of the embodiments of the present disclosure, in a fifth possible implementation manner of the second aspect of the embodiments of the present disclosure, the apparatus further includes a counting unit configured to count a probability that a word related to the any topic in the topic cluster obtained by the first obtaining unit appears in the to-be-retrieved document when the to-be-retrieved document detected by the detecting unit is not within the documents of different fields stored by the first storing unit, a second computing unit configured to compute, according to the probability that the word related to the any topic appears and that is counted by the counting unit, a probability that the any topic appears in the to-be-retrieved document, and a third computing unit configured to compute a similarity between the to-be-retrieved document and any corresponding document according to the probability that the any topic appears in the to-be-retrieved document and that is computed by the second computing unit, a probability that the any topic appears in the any corresponding document and that is obtained by the second obtaining unit, and a matching weight, obtained by the second obtaining unit, of the any topic for a field to which the to-be-retrieved document belongs and for a field to which the any corresponding document belongs.

With reference to the fifth possible implementation manner of the second aspect of the embodiments of the present disclosure, in a sixth possible implementation manner of the second aspect of the embodiments of the present disclosure, the apparatus further includes a second sorting unit configured to perform similarity sorting on similarities, computed by the third computing unit, between the to-be-retrieved document and the corresponding documents according to the similarities in descending order, a second selecting unit configured to select, starting from the highest similarity in the similarity sorting list sorted by the second sorting unit, a similarity greater than or equal to a preset threshold as a similarity between the to-be-retrieved document and the corresponding documents matching the to-be-retrieved document, a third storing unit configured to store the similarity selected by the second selecting unit, to the list of similarities between the to-be-retrieved document and the corresponding documents matching the to-be-retrieved document, and a second output unit configured to output, according to the list of similarities, stored by the third storing unit, between the to-be-retrieved document and the corresponding documents matching the to-be-retrieved document, a document list of the corresponding documents matching the to-be-retrieved document.

A third aspect of the embodiments of the present disclosure provides an apparatus for computing a similarity between cross-field documents, including an input apparatus, an output apparatus, and a processor, where the processor performs the following steps: storing documents of different fields, and storing a relationship between any two documents of different fields, where the relationship between the any two documents of different fields is used to describe a determined matching relationship or an undetermined matching relationship between the any two documents, where the determined matching relationship includes a known matching relationship or a known non-matching relationship, performing word segmentation and stop word removal on the documents of different fields, to obtain a vocabulary data set for the documents of different fields, constructing an incidence matrix between the documents of different fields according to the relationship between the any two documents of different fields, obtaining a topic cluster of the documents of different fields according to the vocabulary data set, obtaining a probability that any topic in the topic cluster appears in any document and a matching weight of the any topic for any two different fields according to the incidence matrix and the topic cluster, and computing a similarity between the any two documents according to probabilities that the any topic in the topic cluster appears in the any two documents of different fields and the matching weight of the any topic for the fields to which the any two documents belong.

In a first possible implementation manner of the third aspect of the embodiments of the present disclosure, performing, by the processor, word segmentation and stop word removal on the documents of different fields, to obtain a vocabulary data set for the documents of different fields further includes performing word segmentation and stop word removal on the documents of different fields, to obtain vocabulary data packages corresponding to the documents of different fields, and storing together the vocabulary data packages, to obtain the vocabulary data set for the documents of different fields.

In a second possible implementation manner of the third aspect of the embodiments of the present disclosure, computing, by the processor, a similarity of the any two documents according to probabilities that the any topic in the topic cluster appears in the any two documents of different fields and the matching weight of the any topic for the fields to which the any two documents belong further includes multiplying the probabilities that the any topic in the topic cluster appears in the any two documents of different fields, to obtain a probability product, multiplying the probability product by the matching weight of the any topic for the fields to which the any two documents belong, to obtain the similarity between the any two documents with respect to the any topic, adding up similarities between the any two documents with respect to topics in the topic cluster, to obtain an initial similarity between the any two documents, and performing normalization processing on the initial similarity between the any two documents, to obtain the similarity between the any two documents.

With reference to the third aspect of the embodiments of the present disclosure or the first possible implementation manner of the third aspect of the embodiments of the present disclosure, in a third possible implementation manner of the third aspect of the embodiments of the present disclosure, after computing, by the processor, a similarity of the any two documents according to probabilities that the any topic in the topic cluster appears in the any two documents of different fields and the matching weight of the any topic for the fields to which the any two documents belong, the processor further performs the following steps: performing similarity sorting on similarities between the any document and corresponding documents according to the similarities in descending order, where a field of the corresponding documents is different from that of the any document, selecting, starting from the highest similarity in the similarity sorting list, a similarity greater than or equal to a preset threshold as a similarity between the any document and the corresponding documents matching the any document, and storing the selected similarity to a list of similarities between the any document and the corresponding documents matching the any document.

With reference to the third possible implementation manner of the third aspect of the embodiments of the present disclosure, in a fourth possible implementation manner of the third aspect of the embodiments of the present disclosure, after storing, by the processor, the selected similarity to a list of similarities between the any document and the corresponding documents matching the any document, the processor further performs the following steps: detecting a to-be-retrieved document input by a user, determining whether the to-be-retrieved document is within the documents of different fields, querying the stored list of similarities for a list of similarities between the to-be-retrieved document and corresponding documents matching the to-be-retrieved document if the to-be-retrieved document is within the documents of different fields, and outputting, according to the list of similarities between the to-be-retrieved document and the corresponding documents matching the to-be-retrieved document, a document list of the corresponding documents matching the to-be-retrieved document.

With reference to the fourth possible implementation manner of the third aspect of the embodiments of the present disclosure, in a fifth possible implementation manner of the third aspect of the embodiments of the present disclosure, the processor further performs the following steps: counting a probability that a word related to the any topic in the topic cluster appears in the to-be-retrieved document if the to-be-retrieved document is not within the documents of different fields, computing, according to the probability that the word related to the any topic appears, a probability that the any topic appears in the to-be-retrieved document, and computing a similarity between the to-be-retrieved document and any corresponding document according to the probability that the any topic appears in the to-be-retrieved document, a probability that the any topic appears in the any corresponding document, and a matching weight of the any topic for a field to which the to-be-retrieved document belongs and for a field to which the any corresponding document belongs.

With reference to the fifth possible implementation manner of the third aspect of the embodiments of the present disclosure, in a sixth possible implementation manner of the third aspect of the embodiments of the present disclosure, after computing, by the processor, a similarity between the to-be-retrieved document and any corresponding document according to the probability that the any topic appears in the to-be-retrieved document, a probability that the any topic appears in any corresponding document, and a matching weight of the any topic for a field to which the to-be-retrieved document belongs and for a field to which the any corresponding document belongs, the processor further performs the following steps: performing similarity sorting on similarities between the to-be-retrieved document and the corresponding documents according to the similarities in descending order, selecting, starting from the highest similarity in the similarity sorting list, a similarity greater than or equal to a preset threshold as a similarity between the to-be-retrieved document and the corresponding documents matching the to-be-retrieved document, and storing the selected similarity to the list of similarities between the to-be-retrieved document and the corresponding documents matching the to-be-retrieved document, and outputting, according to the list of similarities between the to-be-retrieved document and the corresponding documents matching the to-be-retrieved document, a document list of the corresponding documents matching the to-be-retrieved document.

In the embodiments of the present disclosure, after documents of different fields and a relationship between any two documents of different fields are stored, word segmentation and stop word removal are performed on the documents of different fields, to obtain a vocabulary data set for the documents of different fields. An incidence matrix between the documents of different fields is constructed according to the relationship between the any two documents of different fields. Next, a topic cluster of the documents of different fields is obtained according to the vocabulary data set. A probability that any topic in the topic cluster appears in any document and a matching weight of the any topic for any two different fields are obtained according to the incidence matrix and the topic cluster, and then, a similarity between the any two documents is computed according to probabilities that the any topic in the topic cluster appears in the any two documents of different fields and the matching weight of the any topic for the fields to which the any two documents belong. Compared with the prior art, in the embodiments of the present disclosure, a similarity between two documents of different fields is computed according to correlation between the two documents with respect to a related topic. Therefore, accuracy of a similarity between cross-field documents can be improved such that accuracy of matching between the cross-field documents is improved according to the similarity.

BRIEF DESCRIPTION OF DRAWINGS

To describe the technical solutions in the embodiments of the present disclosure more clearly, the following briefly introduces the accompanying drawings required for describing the embodiments. The accompanying drawings in the following description show merely some embodiments of the present disclosure, and a person of ordinary skill in the art may still derive other drawings from these accompanying drawings without creative efforts.

DESCRIPTION OF EMBODIMENTS

The following clearly describes the technical solutions in the embodiments of the present disclosure with reference to the accompanying drawings in the embodiments of the present disclosure. The described embodiments are merely a part rather than all of the embodiments of the present disclosure. All other embodiments obtained by a person of ordinary skill in the art based on the embodiments of the present disclosure without creative efforts shall fall within the protection scope of the present disclosure.

The embodiments of the present disclosure provide a method and an apparatus for computing a similarity between cross-field documents, which can improve accuracy of the similarity between cross-field documents such that accuracy of matching between the cross-field documents is improved according to the similarity. The following describes the method and the apparatus for computing a similarity between cross-field documents in detail.

Figure 1:
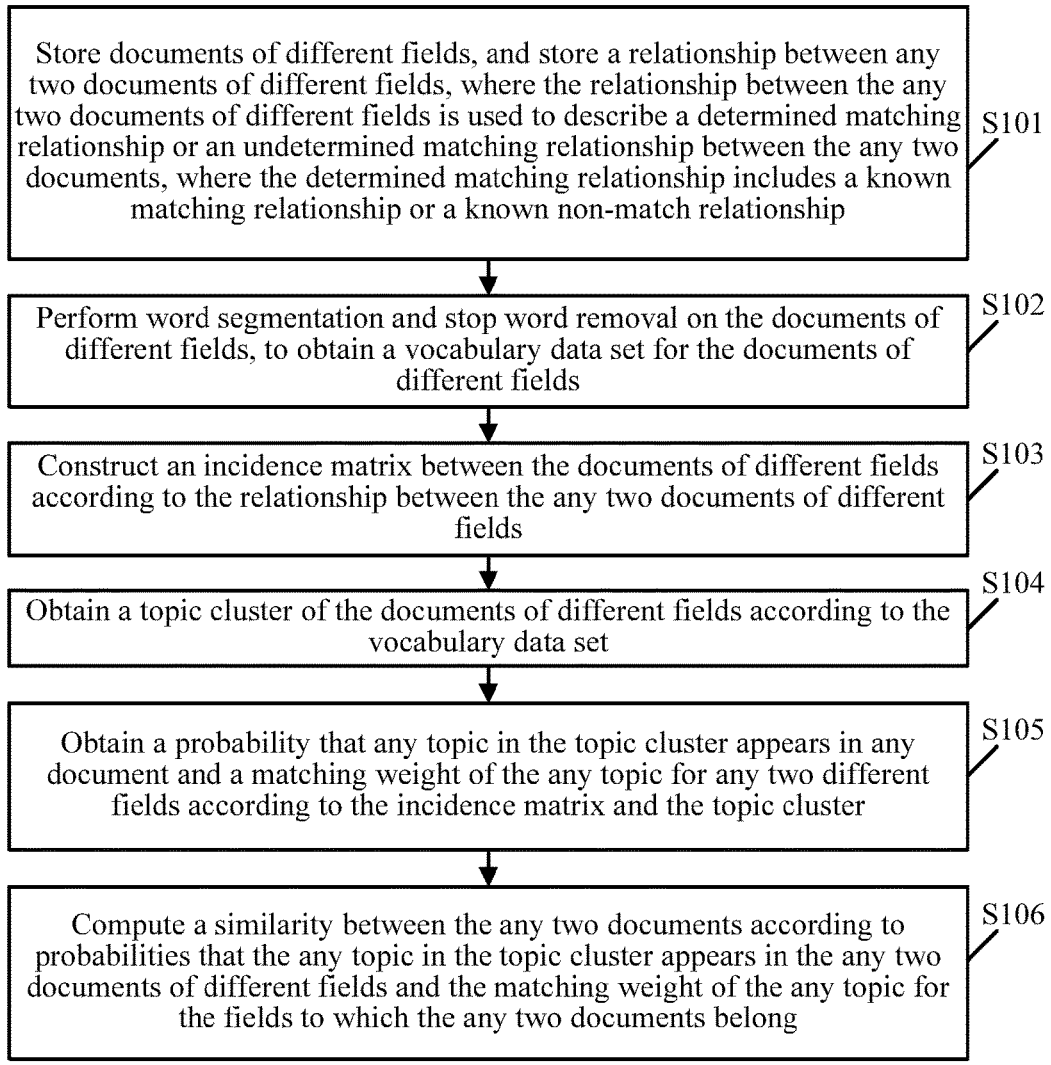
FIG. 1 is a flowchart of a method for computing a similarity between cross-field documents according to an embodiment of the present disclosure.

Referring to FIG. 1, FIG. 1 is a flowchart of a method for computing a similarity between cross-field documents according to an embodiment of the present disclosure. The method for computing a similarity between cross-field documents shown in FIG. 1 is applicable to a terminal device with a display screen, such as a mobile phone and a tablet computer, which is not limited in this embodiment of the present disclosure. As shown in FIG. 1, the method for computing a similarity between cross-field documents may include the following steps.

Step S101: Store documents of different fields, and store a relationship between any two documents of different fields, where the relationship between the any two documents of different fields is used to describe a determined matching relationship or an undetermined matching relationship between the any two documents, where the determined matching relationship includes a known matching relationship or a known non-matching relationship.

In this embodiment of the present disclosure, a terminal device stores the documents of different fields, and stores the relationship between the any two documents of different fields, where the relationship between the any two documents of different fields is used to describe the determined matching relationship or the undetermined matching relationship between the any two documents, where the determined matching relationship includes the known matching relationship or the known non-matching relationship.

In this embodiment of the present disclosure, a user may periodically store current documents of different fields and the relationship between the any two documents of different fields. The determined matching relationship between the two documents indicates that the relationship between the two documents is clearly known when the user stores the documents, where the known matching relationship between the two documents indicates that these two documents have a same topic or a related topic, and the known non-matching relationship between the two documents indicates that these two documents have neither a same topic nor a related topic. The undetermined matching relationship between the two documents indicates that whether these two documents have a same topic or a related topic is unknown when the user stores the documents.

Step S102: Perform word segmentation and stop word removal on the documents of different fields, to obtain a vocabulary data set for the documents of different fields.

In this embodiment of the present disclosure, the terminal device performs word segmentation and stop word removal on the documents of different fields, to obtain the vocabulary data set for the documents of different fields.

In this embodiment of the present disclosure, that the terminal device performs word segmentation and stop word removal on the documents of different fields, to obtain the vocabulary data set for the documents of different fields may include the following steps.

Step A: The terminal device performs word segmentation and stop word removal on the documents of different fields, to obtain vocabulary data packages corresponding to the documents of different fields.

In this embodiment of the present disclosure, the terminal device segments each document into separate words, and removes a word having small matching value in each document, to obtain a vocabulary data package of each document.

Step B: The terminal device stores together the vocabulary data packages, to obtain the vocabulary data set for the documents of different fields.

For example, assuming that there are n documents of different fields in total, there are n vocabulary data packages of the documents. The vocabulary data set may be shown in Table 1, a vocabulary data package of each document may be in one line of the vocabulary data set, and the first column may present names of the documents or may present numbers corresponding to the documents provided that the names or the numbers can correspond to the corresponding documents, which is not limited in the present disclosure, and the second column presents vocabulary data packages corresponding to the documents in the first column. A vocabulary data package not only includes a word that appears in a document, but also includes a quantity of times that the word appears in the document. For example, "according to 5" indicates that the word "according to" appears five times in the document.

TABLE 1

| Vocabulary data package | |
| --- | --- |
| Document name/number | Vocabulary data package |
| Document 1 | Vocabulary data package 1 |
| Document 2 | Vocabulary data package 2 |
| Document 3 | Vocabulary data package 3 |
| . . . | . . . |

Step S103: Construct an incidence matrix between the documents of different fields according to the relationship between the any two documents of different fields.

In this embodiment of the present disclosure, the terminal device constructs the incidence matrix between the documents of different fields according to the relationship between the any two documents of different fields.

In this embodiment of the present disclosure, an element $L_{ij}$ in the incidence matrix is used to describe a relationship between a document i and a document j of different fields. When a known matching relationship exists between the document i and the document j, the element $L_{ij}=1$ in the incidence matrix holds true. When a known non-matching relationship exists between the document i and the document j, the element $L_{ij}=-1$ in the incidence matrix holds true. When an undetermined matching relationship exists between the document i and the document j, the element $L_{ij}=?$ in the incidence matrix holds true. The incidence matrix, constructed according to the foregoing method, between the two documents of different fields may be shown in Table 2.

TABLE 2

| | | Incidence matrix | |
|---|---|---|---|
| 1 | −1 | ? | ... |
| −1 | ? | 1 | ... |
| ? | 1 | ? | ... |
| ... | ... | ... | ... |

Step S104: Obtain a topic cluster of the documents of different fields according to the vocabulary data set.

In this embodiment of the present disclosure, the terminal device obtains the topic cluster of the documents of different fields according to the vocabulary data set.

In this embodiment of the present disclosure, a topic included in each document may be obtained according to a vocabulary data package of each document in the vocabulary data set, and then, all topics included in all documents are gathered to obtain the topic cluster of the documents of different fields.

For example, assuming that there are three documents in total, where a document A includes topic 1, topic 2, and topic 3, a document B includes topic 1, topic 4, and topic 5, and a document C includes topic 2, topic 6, topic 7, and topic 8, a topic cluster of these three documents includes eight topics: topic 1, topic 2, topic 3, topic 4, topic 5, topic 6, topic 7, and topic 8.

Step S105: Obtain a probability that any topic in the topic cluster appears in any document and a matching weight of the any topic for any two different fields according to the incidence matrix and the topic cluster.

In this embodiment of the present disclosure, the terminal device obtains the probability that the any topic in the topic cluster appears in the any document and the matching weight of the any topic for the any two different fields according to the incidence matrix and the topic cluster.

In this embodiment of the present disclosure, the topic cluster in step S104, and the probability that the any topic in the topic cluster appears in the any document and the matching weight of the any topic for the any two different fields in step S105 can be simultaneously obtained according to the vocabulary data set and the incidence matrix using a machine learning algorithm. The machine learning algorithm may be an EM algorithm, for example, a variational EM algorithm, or may be a Markov chain Monte Carlo (MCMC) algorithm, for example, a Gibbs sampling algorithm, which is not limited in the present disclosure.

Figure 5:
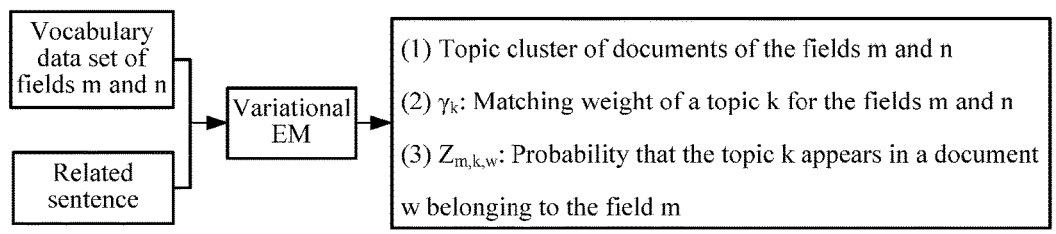
FIG. 5 is a schematic diagram of obtaining a topic cluster, a probability, and a matching weight using a variational expectation-maximization (EM) algorithm.

For example, it is assumed that there are documents of totally two fields. Vocabulary data set of the documents of these two fields and an incidence matrix constructed between the documents of these two fields are used as inputs of the Variational EM algorithm, and then a topic cluster of all documents of these two fields, a probability that any topic in the topic cluster appears in any document, and a matching weight of the any topic for these two fields are output, which may be shown in FIG. 5. In the Variational EM algorithm, a probability that a word belonging to any topic appears in a document is first obtained, and then a probability that the any topic appears in any document is obtained according to the probability that the word belonging to the any topic appears in the document.

Step S106: Compute a similarity between the any two documents according to probabilities that the any topic in the topic cluster appears in the any two documents of different fields and the matching weight of the any topic for the fields to which the any two documents belong.

In this embodiment of the present disclosure, the terminal device computes the similarity of the any two documents according to the probabilities that the any topic in the topic cluster appears in the any two documents of different fields and the matching weight of the any topic for the fields to which the any two documents belong.

In this embodiment of the present disclosure, that the terminal device computes the similarity between the any two documents according to probabilities that the any topic in the topic cluster appears in the any two documents of different fields and the matching weight of the any topic for the fields to which the any two documents belong may include the following steps.

Step A: Multiply the probabilities that the any topic in the topic cluster appears in the any two documents of different fields, to obtain a probability product.

Step B: Multiply the probability product by the matching weight of the any topic for the fields to which the any two documents belong, to obtain the similarity between the any two documents with respect to the any topic.

Step C: Add up similarities between the any two documents with respect to topics in the topic cluster, to obtain an initial similarity between the any two documents.

Step D: Perform normalization processing on the initial similarity between the any two documents, to obtain the similarity between the any two documents.

For example, a document a and a document b of different fields are provided, where a relationship between these two documents is unknown. Assuming that a probability that any topic in a topic cluster appears in the document a is $Z_a$, a probability that the any topic in the topic cluster appears in the document b is $Z_b$, and a matching weight of the any topic in the topic cluster for the fields to which the document a and the document b belong is $\gamma$, a probability product $Z_{k,a,b}$ for the document a and the document b may be obtained according to probabilities that any topic k in the topic cluster appears in the document a and the document b, where the probability product $Z_{k,a,b}$ is as follows:

$$Z_{k,a,b}=Z_{k,a}*Z_{k,b},$$

where $Z_{k,a}$ and $Z_{k,b}$ are respectively the probabilities that the topic k in the topic cluster appears in the document a and the document b, and a similarity $\beta_k$ of the document a and the document b with respect to the topic k is as follows:

$$\beta_k=Z_{k,a,b}*\gamma_k,$$

where $\gamma_k$ is a matching weight of the topic k for the fields to which the document a and the document b belong, and an initial similarity $\beta$ of the document a and the document b is as follows:

$$\beta=\Sigma_1^k\beta_k,$$

where a value of the obtained initial similarity $\beta$ of the document a and the document b is generally not between 0 and 1. In order to ensure that the value of the similarity is between 0 and 1, normalization processing needs to be performed on the initial similarity β of the document a and the document b.

In this embodiment of the present disclosure, word segmentation and stop word removal are performed on the documents of different fields, to obtain a vocabulary data set for the documents of different fields after documents of different fields and a relationship between any two documents of different fields are stored. An incidence matrix between the documents of different fields is constructed according to the relationship between the any two documents of different fields. Next, a topic cluster of the documents of different fields is obtained according to the vocabulary data set. A probability that any topic in the topic cluster appears in any document and a matching weight of the any topic for any two different fields are obtained according to the incidence matrix and the topic cluster, and then, a similarity between the any two documents is computed according to probabilities that the any topic in the topic cluster appears in the any two documents of different fields and the matching weight of the any topic for the fields to which the any two documents belong. Compared with the prior art, in this embodiment of the present disclosure, a similarity between two documents of different fields is computed according to correlation between the two documents with respect to a related topic. Therefore, accuracy of a similarity between cross-field documents can be improved such that accuracy of matching between the cross-field documents is improved according to the similarity.

Figure 2:
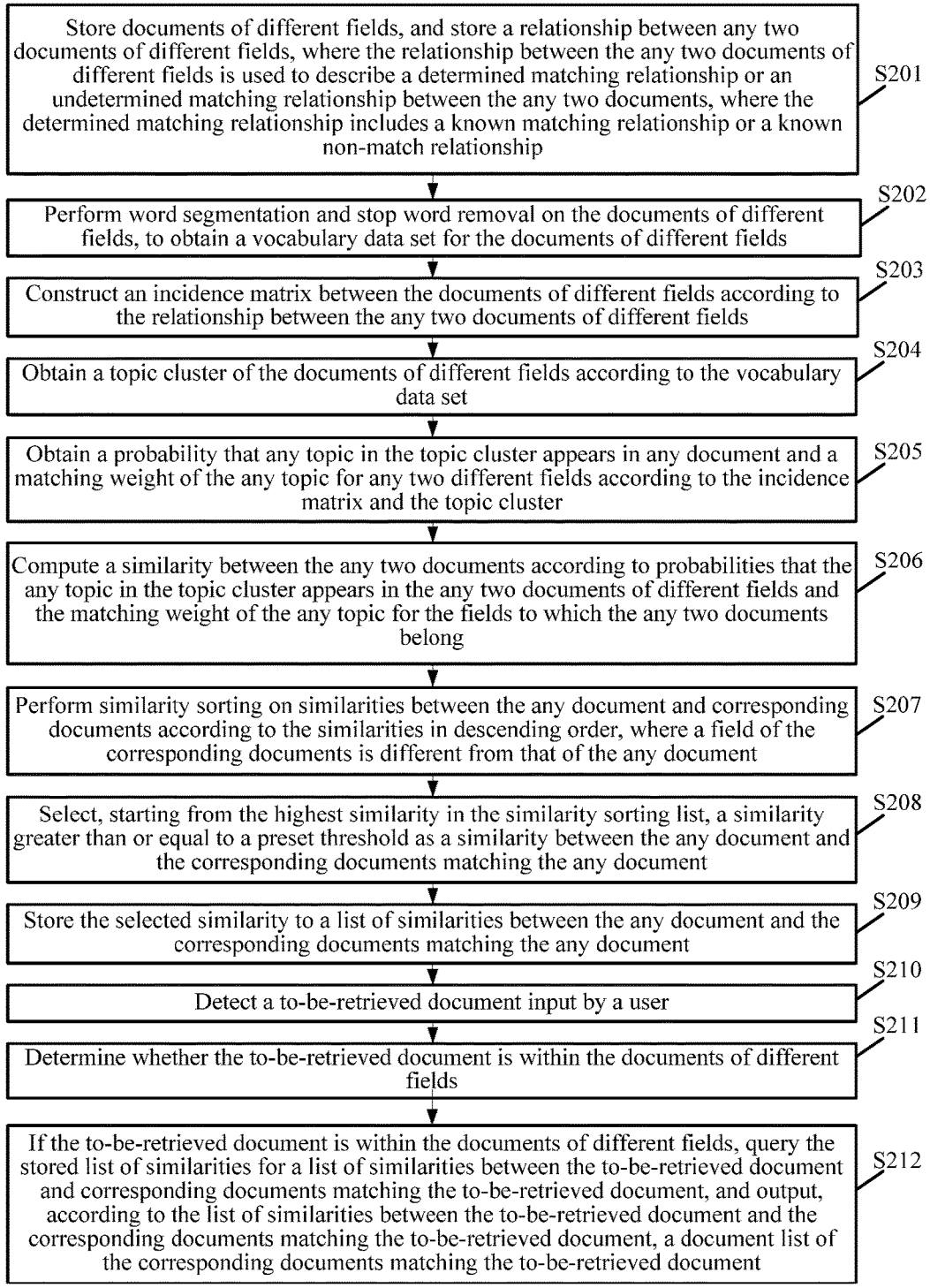
FIG. 2 is a flowchart of another method for computing a similarity between cross-field documents according to an embodiment of the present disclosure.

Referring to FIG. 2, FIG. 2 is a flowchart of another method for computing a similarity between cross-field documents according to an embodiment of the present disclosure. The method for computing a similarity between cross-field documents shown in FIG. 2 is applicable to a terminal device with a display screen, such as a mobile phone and a tablet computer, which is not limited in this embodiment of the present disclosure. As shown in FIG. 2, the method for computing a similarity between cross-field documents may include the following steps.

Step S201: A terminal device stores documents of different fields, and stores a relationship between any two documents of different fields, where the relationship between the any two documents of different fields is used to describe a determined matching relationship or an undetermined matching relationship between the any two documents, where the determined matching relationship includes a known matching relationship or a known non-matching relationship.

In this embodiment of the present disclosure, a user may periodically store current documents of different fields and the relationship between the any two documents of different fields. The determined matching relationship between the two documents indicates that the relationship between the two documents is clearly known when the user stores the documents, where the known matching relationship between the two documents indicates that these two documents have a same topic or a related topic, and the known non-matching relationship between the two documents indicates that these two documents have neither a same topic nor a related topic. The undetermined matching relationship between the two documents indicates that whether these two documents have a same topic or a related topic is unknown when the user stores the documents.

Step S202: The terminal device performs word segmentation and stop word removal on the documents of different fields, to obtain a vocabulary data set for the documents of different fields.

In this embodiment of the present disclosure, that the terminal device performs word segmentation and stop word removal on the documents of different fields, to obtain a vocabulary data set for the documents of different fields may include the following steps.

Step A: The terminal device performs word segmentation and stop word removal on the documents of different fields, to obtain vocabulary data packages corresponding to the documents of different fields.

In this embodiment of the present disclosure, the terminal device segments each document into separate words, and removes a word having small matching value in each document, to obtain a vocabulary data package of each document.

Step B: The terminal device stores together the vocabulary data packages, to obtain the vocabulary data set for the documents of different fields.

For example, assuming that there are n documents of different fields in total, there are n vocabulary data packages of the documents. The vocabulary data set may be listed in Table 3, a vocabulary data package of each document may be in one line of the vocabulary data set, and the first column may present names of the documents or may present numbers corresponding to the documents provided that the names or the numbers can correspond to the corresponding documents, which is not limited in the present disclosure, and the second column presents vocabulary data packages corresponding to the documents in the first column. A vocabulary data package not only includes a word in a document, but also includes a quantity of times that the word appears in the document. For example, "according to 5" indicates that the word "according to" appears five times in the document.

TABLE 3

| Vocabulary data package | |
| --- | --- |
| Document name/number | Vocabulary data package |
| Document 1 | Vocabulary data package 1 |
| Document 2 | Vocabulary data package 2 |
| Document 2 | Vocabulary data package 3 |
| . . . | . . . |

Step S203: The terminal device constructs an incidence matrix between the documents of different fields according to the relationship between the any two documents of different fields.

In this embodiment of the present disclosure, an element $L_{ij}$ in the incidence matrix is used to describe a relationship between a document i and a document j of different fields. When a known matching relationship exists between the document i and the document j, the element $L_{ij}=1$ in the incidence matrix holds true. When a known non-matching relationship exists between the document i and the document j, the element $L_{ij}=-1$ in the incidence matrix holds true.

When an undetermined matching relationship exists between the document i and the document j, the element $L_{ij}=?$ in the incidence matrix holds true. The incidence matrix, constructed according to the foregoing method, between the two documents of different fields may be listed in Table 4.

TABLE 4

| | Incidence matrix | | |
|---|---|---|---|
| 1 | −1 | ? | ... |
| −1 | ? | 1 | ... |
| ? | 1 | ? | ... |
| ... | ... | ... | ... |

Step S204: The terminal device obtains a topic cluster of the documents of different fields according to the vocabulary data set.

In this embodiment of the present disclosure, a topic included in each document may be obtained according to a vocabulary data package of each document in the vocabulary data sets, and then, all topics included in all documents are gathered to obtain the topic cluster of the documents of different fields.

For example, assuming that there are three documents in total, a document A includes topic 1, topic 2, and topic 3, a document B includes topic 1, topic 4, and topic 5, and a document C includes topic 2, topic 6, topic 7, and topic 8, a topic cluster of these three documents includes eight topics topic 1, topic 2, topic 3, topic 4, topic 5, topic 6, topic 7, and topic 8.

Step S205: The terminal device obtains a probability that any topic in the topic cluster appears in any document and a matching weight of the any topic for any two different fields according to the incidence matrix and the topic cluster.

In this embodiment of the present disclosure, the topic cluster in step S204, and the probability that the any topic in the topic cluster appears in the any document and the matching weight of the any topic for the any two different fields in step S205 can be simultaneously obtained according to the vocabulary data set and the incidence matrix using a machine learning algorithm. The machine learning algorithm may be an EM algorithm, for example, a variational EM algorithm, or may be a MCMC algorithm, for example, a Gibbs sampling algorithm, which is not limited in the present disclosure.

For example, it is assumed that there are two fields of documents in total. A vocabulary data set of the documents of these two fields and an incidence matrix constructed between the documents of these two fields are used as inputs of the variational EM algorithm, and then a topic cluster of all documents of these two fields, a probability that any topic in the topic cluster appears in any document, and a matching weight of the any topic for these two fields are output, which may be shown in FIG. 5. In the variational EM algorithm, a probability that a word belonging to any topic appears in a document is first obtained, and then a probability that the any topic appears in any document is obtained according to the probability that the word belonging to the any topic appears in the document.

Step S206: The terminal device computes a similarity between the any two documents according to probabilities that the any topic in the topic cluster appears in the any two documents of different fields and the matching weight of the any topic for the fields to which the any two documents belong.

In this embodiment of the present disclosure, that the terminal device computes a similarity between the any two documents according to probabilities that the any topic in the topic cluster appears in the any two documents of different fields and the matching weight of the any topic for the fields to which the any two documents belong may include the following steps.

Step A: Multiply the probabilities that the any topic in the topic cluster appears in the any two documents of different fields, to obtain a probability product.

Step B: Multiply the probability product by the matching weight of the any topic for the fields to which the any two documents belong, to obtain the similarity between the any two documents with respect to the any topic.

Step C: Add up similarities between the any two documents with respect to topics in the topic cluster, to obtain an initial similarity between the any two documents.

Step D: Perform normalization processing on the initial similarity between the any two documents, to obtain the similarity between the any two documents.

For example, a document a and a document b of different fields are provided, where a relationship between these two documents is unknown. Assuming that a probability that any topic in a topic cluster appears in the document a is $Z_a$, a probability that the any topic in the topic cluster appears in the document b is $Z_b$, and a matching weight of the any topic in the topic cluster for the fields to which the document a and the document b belong is γ, a probability product $Z_{k,a,b}$ for the document a and the document b may be obtained according to probabilities that any topic k in the topic cluster appears in the document a and the document b, where the probability product $Z_{k,a,b}$ is as follows:

$$Z_{k,a,b}=Z_{k,a}*Z_{k,b},$$

where $Z_{k,a}$ and $Z_{k,b}$ are respectively the probabilities that the topic k in the topic cluster appears in the document a and the document b, and a similarity $\beta_k$ of the document a and the document b with respect to the topic k is as follows:

$$\beta_k=Z_{k,a,b}*\gamma_k,$$

where $\gamma_k$ is a matching weight of the topic k for the fields to which the document a and the document b belong, and an initial similarity β of the document a and the document b is as follows:

$$\beta=\Sigma_1^k \beta_k,$$

where a value of the obtained initial similarity β of the document a and the document b is generally not between 0 and 1. In order to ensure the value of the similarity to be between 0 and 1, normalization processing needs to be performed on the initial similarity β of the document a and the document b.

Step S207: The terminal device performs similarity sorting on similarities between the any document and corresponding documents according to the similarities in descending order, where a field of the corresponding documents is different from that of the any document.

In this embodiment of the present disclosure, a document has a similarity with any document of another field, but only that a similarity between the document and some documents is 0. Therefore, similarity sorting may be performed on similarities between this document and all corresponding documents according to the similarities in descending order such that a higher similarity is sorted before a lower similarity.

Step S208: The terminal device selects, starting from the highest similarity in the similarity sorting list, a similarity greater than or equal to a preset threshold as a similarity between the any document and the corresponding documents matching the any document.

In this embodiment of the present disclosure, after the similarity sorting is performed on the similarities between the any document and all the corresponding documents according to the similarities in descending order, the similarity greater than or equal to the preset threshold may be obtained through selection, and it is considered that a document of another field whose similarity to the document is greater than or equal to the preset threshold matches the document. The higher similarity between two documents indicates a larger opportunity for matching between the two documents.

Step S209: The terminal device stores the selected similarity to a list of similarities between the any document and the corresponding documents matching the any document.

In this embodiment of the present disclosure, the selected similarity, which is greater than or equal to the preset threshold, is stored to a list of similarities between the document and the corresponding documents matching the document, to facilitate retrieval by the user.

Step S210: The terminal device detects a to-be-retrieved document input by a user.

In this embodiment of the present disclosure, when the user inputs the to-be-retrieved document, the terminal device detects the to-be-retrieved document input by the user such that the terminal device retrieves, according to the to-be-retrieved document, a cross-field document matching the to-be-retrieved document.

Step S211: The terminal device determines whether the to-be-retrieved document is within the documents of different fields.

In this embodiment of the present disclosure, after detecting the to-be-retrieved document input by the user, the terminal device detects whether the to-be-retrieved document is within the documents of different fields such that the terminal device selects a corresponding method to output a list of matched documents corresponding to the to-be-retrieved document.

Step S212: If the to-be-retrieved document is within the documents of different fields, the terminal device queries the stored list of similarities for a list of similarities between the to-be-retrieved document and corresponding documents matching the to-be-retrieved document, and outputs, according to the list of similarities between the to-be-retrieved document and the corresponding documents matching the to-be-retrieved document, a document list of the corresponding documents matching the to-be-retrieved document.

In this embodiment of the present disclosure, when it is determined that the to-be-retrieved document is within the stored documents of different fields, the stored similarity list is queried for a list of similarities between the to-be-retrieved document and a document that is of another field and that matches the to-be-retrieved document, and a list of matched documents matching the to-be-retrieved document is output according to the queried list of similarities between the to-be-retrieved document and the document that is of the other field and that matches the to-be-retrieved document. A document of another field having a higher similarity to the to-be-retrieved document is in a higher location in the list of matched documents.

Correspondingly, when it is determined that the to-be-retrieved document is not within the stored documents of different fields, the list of matched documents matching the to-be-retrieved document may be obtained according to the following steps.

Step A: Count a probability that a word related to any topic in a topic cluster appears in the to-be-retrieved document.

Step B: Compute, according to the probability that the word related to the any topic appears, a probability that the any topic appears in the to-be-retrieved document.

Step C: Compute a similarity between the to-be-retrieved document and any corresponding document according to the probability that the any topic appears in the to-be-retrieved document, a probability that the any topic appears in the any corresponding document, and a matching weight of the any topic for a field to which the to-be-retrieved document belongs and for a field to which the any corresponding document belongs.

Step D: Perform similarity sorting on similarities between the to-be-retrieved document and the corresponding documents according to the similarities in descending order.

Step E: Select, starting from the highest similarity in the similarity sorting list, a similarity greater than or equal to a preset threshold as a similarity between the to-be-retrieved document and the corresponding documents matching the to-be-retrieved document.

Step F: Store the selected similarity to the list of similarities between the to-be-retrieved document and the corresponding documents matching the to-be-retrieved document.

Step G: Output, according to the list of similarities between the to-be-retrieved document and the corresponding documents matching the to-be-retrieved document, a document list of the corresponding documents matching the to-be-retrieved document.

In this embodiment of the present disclosure, after documents of different fields and a relationship between any two documents of different fields are stored, word segmentation and stop word removal are performed on the documents of different fields, to obtain a vocabulary data set for the documents of different fields. An incidence matrix between the documents of different fields is constructed according to the relationship between the any two documents of different fields. Next, a topic cluster of the documents of different fields is obtained according to the vocabulary data set. A probability that any topic in the topic cluster appears in any document and a matching weight of the any topic for any two different fields are obtained according to the incidence matrix and the topic cluster, and then, a similarity between the any two documents is computed according to probabilities that the any topic in the topic cluster appears in the any two documents of different fields and the matching weight of the any topic for the fields to which the any two documents belong. Compared with the prior art, in this embodiment of the present disclosure, a similarity between two documents of different fields is computed according to correlation between the two documents with respect to a related topic. Therefore, accuracy of a similarity between cross-field documents can be improved such that accuracy of matching between the cross-field documents is improved according to the similarity. In addition, similarity sorting is performed on the similarities between the any document and corresponding documents according to the similarities in descending order, a similarity greater than or equal to a preset threshold is selected as a similarity between the any document and the corresponding documents matching the any document, the similarity is stored to a similarity list, and whether a to-be-retrieved document is within the stored documents of different fields can be determined. If the to-be-retrieved document is within the stored documents of different fields, a list of matched documents, corresponding to the corresponding stored similarity list, is output according to the corresponding stored similarity list. If the to-be-retrieved document is not within the stored documents of different fields, a similarity between the to-be-retrieved document and a document of another field is computed, and the list of matched documents matching the to-be-retrieved document is output. Therefore, when the to-be-retrieved document is within the stored documents, a user may retrieve a cross-field document matching the to-be-retrieved document. The user may also retrieve a cross-field document matching the to-be-retrieved document when the to-be-retrieved document is not within the stored documents. In this way, strong adaptability is achieved in the solutions.

Figure 3:
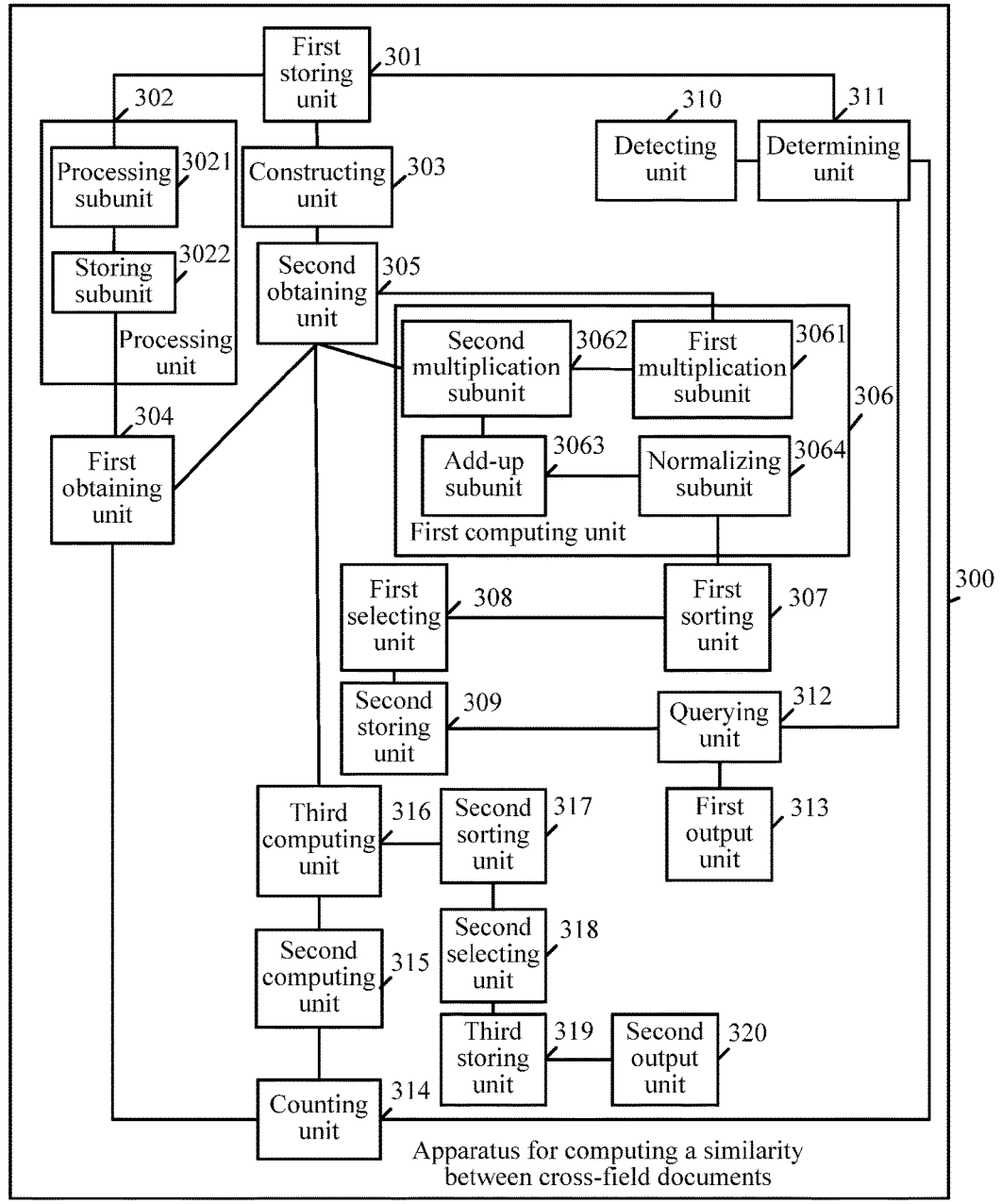
FIG. 3 is a structural diagram of an apparatus for computing a similarity between cross-field documents according to an embodiment of the present disclosure.

Referring to FIG. 3, FIG. 3 is a structural diagram of an apparatus for computing a similarity between cross-field documents according to an embodiment of the present disclosure. The apparatus for computing a similarity between cross-field documents shown in FIG. 3 is applicable to a terminal device with a display screen, such as a mobile phone and a tablet computer, which is not limited in this embodiment of the present disclosure. As shown in FIG. 3, the apparatus for computing a similarity between cross-field documents 300 may include a first storing unit 301 configured to store documents of different fields, and store a relationship between any two documents of different fields, where the relationship between the any two documents of different fields is used to describe a determined matching relationship or an undetermined matching relationship between the any two documents, where the determined matching relationship includes a known matching relationship or a known non-matching relationship, a processing unit 302 configured to perform word segmentation and stop word removal on the documents of different fields stored by the first storing unit 301, to obtain a vocabulary data set for the documents of different fields, a constructing unit 303 configured to construct an incidence matrix between the documents of different fields according to the relationship, stored by the first storing unit 301, between the any two documents of different fields, a first obtaining unit 304 configured to obtain a topic cluster of the documents of different fields according to the vocabulary data set obtained by the processing unit 302, a second obtaining unit 305 configured to obtain a probability that any topic in the topic cluster appears in any document and a matching weight of the any topic for any two different fields according to the incidence matrix constructed by the constructing unit 303 and the topic cluster obtained by the first obtaining unit 304, and a first computing unit 306 configured to compute a similarity between the any two documents according to probabilities that the any topic in the topic cluster appears in the any two documents of different fields and the matching weight of the any topic for the fields to which the any two documents belong, where the probabilities and the weight are obtained by the second obtaining unit 305.

In this embodiment of the present disclosure, the processing unit 302 may include a processing subunit 3021 configured to perform word segmentation and stop word removal on the documents of different fields stored by the first storing unit 301, to obtain vocabulary data packages corresponding to the documents of different fields, and a storing subunit 3022 configured to store together the vocabulary data packages obtained by the processing subunit 3021, to obtain the vocabulary data set for the documents of different fields.

In this embodiment of the present disclosure, the first computing unit 306 may include a first multiplication subunit 3061 configured to multiply the probabilities that the any topic in the topic cluster appears in the any two documents of different fields and that are obtained by the second obtaining unit 305, to obtain a probability product, a second multiplication subunit 3062 configured to multiply the probability product by the matching weight of the any topic for the fields to which the any two documents belong, to obtain the similarity between the any two documents with respect to the any topic, where the probability product is obtained by the first multiplication subunit 3061, and the weight is obtained by the second obtaining unit 305, an add-up subunit 3063 configured to add up similarities, obtained by the second multiplication subunit 3062, between the any two documents with respect to topics in the topic cluster, to obtain an initial similarity between the any two documents, and a normalizing subunit 3064 configured to perform normalization processing on the initial similarity between the any two documents obtained by the add-up subunit 3063, to obtain the similarity between the any two documents.

As a possible implementation manner, the apparatus 300 for computing a similarity between cross-field documents may further include a first sorting unit 307 configured to perform similarity sorting on similarities, computed by the first computing unit 306, between the any document and corresponding documents according to the similarities in descending order, where a field of the corresponding documents is different from that of the any document, a first selecting unit 308 configured to select, starting from the highest similarity in the similarity sorting list sorted by the first sorting unit 307, a similarity greater than or equal to a preset threshold as a similarity between the any document and the corresponding documents matching the any document, and a second storing unit 309 configured to store the similarity selected by the first selecting unit 308, to a list of similarities between the any document and corresponding documents matching the any document.

As a possible implementation manner, the apparatus for computing a similarity between cross-field documents 300 may further include a detecting unit 310 configured to detect a to-be-retrieved document input by a user, a determining unit 311 configured to determine whether the to-be-retrieved document detected by the detecting unit 310 is within the documents of different fields stored by the first storing unit 301, a querying unit 312 configured to query the list of similarities, stored by the second storing unit 309, for a list of similarities between the to-be-retrieved document and corresponding documents matching the to-be-retrieved document when a result of the determining performed by the determining unit 311 is yes, and a first output unit 313 configured to output, according to the list of similarities, queried by the querying unit 312, between the to-be-retrieved document and the corresponding documents matching the to-be-retrieved document, a document list of the corresponding documents matching the to-be-retrieved document.

As a possible implementation manner, the apparatus for computing a similarity between cross-field documents 300 may further include a counting unit 314 configured to count a probability that a word related to the any topic in the topic cluster obtained by the first obtaining unit 304 appears in the to-be-retrieved document when the result of the determining performed by the determining unit 311 is no, a second computing unit 315 configured to compute, according to the probability that the word related to the any topic appears and that is counted by the counting unit 314, a probability that the any topic appears in the to-be-retrieved document, and a third computing unit 316 configured to compute a similarity between the to-be-retrieved document and any corresponding document according to the probability that the any topic appears in the to-be-retrieved document and that is computed by the second computing unit 315, a probability that the any topic appears in the any corresponding document and that is obtained by the second obtaining unit 305, and a matching weight, obtained by the second obtaining unit 305, of the any topic for a field to which the to-be-retrieved document belongs and for a field to which the any corresponding document belongs.

As a possible implementation manner, the apparatus for computing a similarity between cross-field documents 300 may further include a second sorting unit 317 configured to perform similarity sorting on similarities, computed by the third computing unit 316, between the to-be-retrieved document and the corresponding documents according to the similarities in descending order, a second selecting unit 318 configured to select, starting from the highest similarity in the similarity sorting list sorted by the second sorting unit 317, a similarity greater than or equal to a preset threshold as a similarity between the to-be-retrieved document and the corresponding documents matching the to-be-retrieved document, a third storing unit 319 configured to store the similarity selected by the second selecting unit 318, to the list of similarities between the to-be-retrieved document and the corresponding documents matching the to-be-retrieved document, and a second output unit 320 configured to output, according to the list of similarities, stored by the third storing unit 319, between the to-be-retrieved document and the corresponding documents matching the to-be-retrieved document, a document list of the corresponding documents matching the to-be-retrieved document.

The apparatus for computing a similarity between cross-field documents 300 shown in FIG. 3 computes a similarity between two documents of different fields according to correlation between the two documents with respect to a related topic. Therefore, accuracy of a similarity between cross-field documents can be improved such that accuracy of matching between the cross-field documents is improved according to the similarity. In addition, when a to-be-retrieved document is within stored documents, a user may retrieve a cross-field document matching the to-be-retrieved document. The user may also retrieve a cross-field document matching the to-be-retrieved document when the to-be-retrieved document is not within the stored documents. In this way, strong adaptability is achieved in the solutions.

Figure 4:
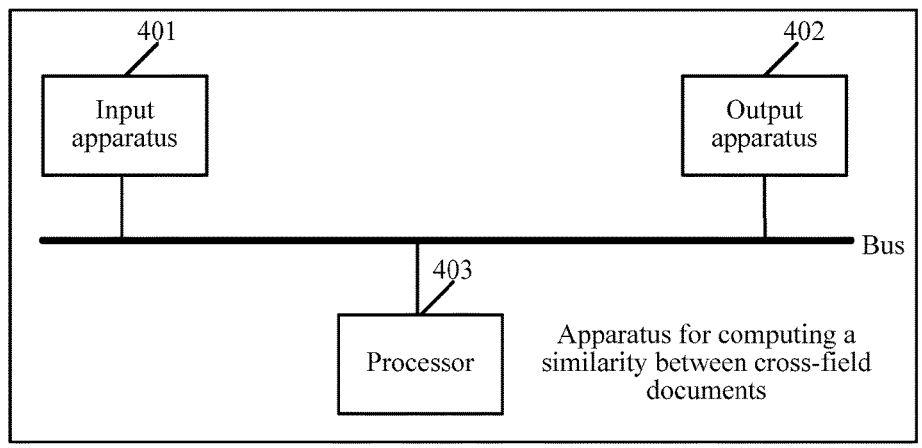
FIG. 4 is a structural diagram of another apparatus for computing a similarity between cross-field documents according to an embodiment of the present disclosure.

Referring to FIG. 4, FIG. 4 is a structural diagram of another apparatus for computing a similarity between cross-field documents according to an embodiment of the present disclosure, and the apparatus is configured to execute the method for computing a similarity between cross-field documents according to the embodiments of the present disclosure. As shown in FIG. 4, the apparatus for computing a similarity between cross-field documents 400 may include an input apparatus 401, an output apparatus 402, and a processor 403. In some embodiments of this application, the input apparatus 401 may be connected to the processor 403 using a bus or in another manner, and the output apparatus 402 may be connected to the processor 403 using a bus or in another manner. In FIG. 4, that the components of the apparatus 400 are connected to each other using a bus is used as an example.

The processor 403 performs the steps of storing documents of different fields, and storing a relationship between any two documents of different fields, where the relationship between the any two documents of different fields is used to describe a determined matching relationship or an undetermined matching relationship between the any two documents, where the determined matching relationship includes a known matching relationship or a known non-matching relationship, performing word segmentation and stop word removal on the documents of different fields, to obtain a vocabulary data set for the documents of different fields, constructing an incidence matrix between the documents of different fields according to the relationship between the any two documents of different fields, obtaining a topic cluster of the documents of different fields according to the vocabulary data set, obtaining a probability that any topic in the topic cluster appears in any document and a matching weight of the any topic for any two different fields according to the incidence matrix and the topic cluster, and computing a similarity between the any two documents according to probabilities that the any topic in the topic cluster appears in the any two documents of different fields and the matching weight of the any topic for the fields to which the any two documents belong.

As a possible implementation manner, the processor 403 is further configured to perform word segmentation and stop word removal on the documents of different fields, to obtain vocabulary data packages corresponding to the documents of different fields, and store together the vocabulary data packages, to obtain the vocabulary data set for the documents of different fields.

As a possible implementation manner, the processor 403 is further configured to multiply the probabilities that the any topic in the topic cluster appears in the any two documents of different fields, to obtain a probability product, multiply the probability product by the matching weight of the any topic for the fields to which the any two documents belong, to obtain the similarity between the any two documents with respect to the any topic, add up similarities between the any two documents with respect to topics in the topic cluster, to obtain an initial similarity between the any two documents, and perform normalization processing on the initial similarity between the any two documents, to obtain the similarity between the any two documents.

As a possible implementation manner, the processor 403 further performs the steps of performing similarity sorting on similarities between the any document and corresponding documents according to the similarities in descending order, where a field of the corresponding documents is different from that of the any document, selecting, starting from the highest similarity in the similarity sorting list, a similarity greater than or equal to a preset threshold as a similarity between the any document and the corresponding documents matching the any document, and storing the selected similarity to a list of similarities between the any document and the corresponding documents matching the any document.

As a possible implementation manner, the processor 403 further performs the steps of detecting a to-be-retrieved document input by a user, determining whether the to-be-retrieved document is within the documents of different fields, querying the stored list of similarities for a list of similarities between the to-be-retrieved document and corresponding documents matching the to-be-retrieved document if the to-be-retrieved document is within the documents of different fields and outputting, according to the list of similarities between the to-be-retrieved document and the corresponding documents matching the to-be-retrieved document, a document list of the corresponding documents matching the to-be-retrieved document.

As a possible implementation manner, the processor 403 further performs the steps of counting a probability that a word related to the any topic in the topic cluster appears in the to-be-retrieved document if the to-be-retrieved document is not within the documents of different fields, computing, according to the probability that the word related to the any topic appears, a probability that the any topic appears in the to-be-retrieved document, and computing a similarity between the to-be-retrieved document and any corresponding document according to the probability that the any topic appears in the to-be-retrieved document, a probability that the any topic appears in the any corresponding document, and a matching weight of the any topic for a field to which the to-be-retrieved document belongs and for a field to which the any corresponding document belongs.

As a possible implementation manner, the processor 403 further performs the steps of performing similarity sorting on similarities between the to-be-retrieved document and the corresponding documents according to the similarities in descending order, selecting, starting from the highest similarity in the similarity sorting list, a similarity greater than or equal to a preset threshold as a similarity between the to-be-retrieved document and the corresponding documents matching the to-be-retrieved document, storing the selected similarity to the list of similarities between the to-be-retrieved document and the corresponding documents matching the to-be-retrieved document, and outputting, according to the list of similarities between the to-be-retrieved document and the corresponding documents matching the to-be-retrieved document, a document list of the corresponding documents matching the to-be-retrieved document.

The apparatus for computing a similarity between cross-field documents shown in FIG. 4 computes a similarity between two documents of different fields according to correlation between the two documents with respect to a related topic. Therefore, accuracy of a similarity between cross-field documents can be improved such that accuracy of matching between the cross-field documents is improved according to the similarity. In addition, when a to-be-retrieved document is within stored documents, a user may retrieve a cross-field document matching the to-be-retrieved document. The user may also retrieve a cross-field document matching the to-be-retrieved document when the to-be-retrieved document is not within the stored documents. In this way, strong adaptability is achieved in the solutions.

In an embodiment, the embodiments of the present disclosure further disclose a computer storage medium, where the computer storage medium stores a computer program. When the computer program stored in the computer storage medium is read into a computer, the computer is enabled to complete all steps of the method for computing a similarity between cross-field documents disclosed in the embodiments of the present disclosure.

A person of ordinary skill in the art may understand that all or a part of the steps of the methods in the embodiments may be implemented by a program instructing relevant hardware. The program may be stored in a computer readable storage medium. The storage medium may include a flash memory, a read-only memory (ROM), a random access memory (RAM), a magnetic disk, and an optical disk.

The foregoing describes in detail the method and the apparatus for computing a similarity between cross-field documents that are provided in the embodiments of the present disclosure. Although the principle and implementation manners of the present disclosure are described with reference to specific examples in the specification, the embodiments are only intended to help understand the method and core idea of the present disclosure. In addition, with respect to the specific implementation manners and application scope, modifications and variations may be made by a person of ordinary skill in the art according to the idea of the present disclosure. In conclusion, the contents in the specification shall not be construed as a limitation on the present disclosure.

What is claimed is:

1. A computer implemented method for computing a similarity between cross-field documents, comprising:
   storing two documents having a plurality of fields;
   storing a relationship between the documents that is used to describe a determined matching relationship or an undetermined matching relationship between the documents, the determined matching relationship comprising a known matching relationship or a known non-matching relationship;
   performing word segmentation and stop word removal on the documents to obtain vocabulary data packages corresponding to the documents;
   storing the vocabulary data packages together to obtain a vocabulary data set for each of the documents;
   constructing an incidence matrix between the documents according to the relationship between the documents;
   obtaining a topic cluster of each of the documents according to the vocabulary data set;
   obtaining a probability that any topic in the topic cluster appears in one of the documents and a matching weight of the topic for any two different fields according to the incidence matrix and the topic cluster;
   multiplying the probability that the topic in the topic cluster appears in the documents to obtain a probability product;
   multiplying the probability product by the matching weight of the topic for the fields to which the documents belong to obtain the similarity between the documents with respect to the topic;
   adding up similarities between the documents with respect to topics in the topic cluster to obtain an initial similarity between the documents; and
   performing normalization processing on the initial similarity between the documents to obtain the similarity between the documents.

2. The method of claim 1, wherein after computing the similarity between the documents according to the probability that the topic in the topic cluster appears in the documents and the matching weight of the topic for the fields to which the documents belong, the method further comprises:
   performing similarity sorting on similarities between the documents and corresponding documents according to the similarities in descending order, a second field of the corresponding documents being different from the fields in the documents;
   selecting, starting from a highest similarity in a similarity sorting list, the similarity greater than or equal to a preset threshold as the similarity between the documents and the corresponding documents matching the documents; and
   storing the similarity to a list of similarities between the documents and the corresponding documents matching the document.

3. The method of claim 2, wherein after storing the similarity to the list of similarities between the documents and the corresponding documents matching the document, the method further comprises:
   detecting a to-be-retrieved document input by a user;
   determining whether the to-be-retrieved document is within the documents;

querying the list of similarities for the list of similarities between the to-be-retrieved document and the corresponding documents matching the to-be-retrieved document when the to-be-retrieved document is within the documents; and outputting, according to the list of similarities between the to-be-retrieved document and the corresponding documents matching the to-be-retrieved document, a document list of the corresponding documents matching the to-be-retrieved document.

4. The method of claim 3, further comprising:

counting another probability that a word related to the topic in the topic cluster appears in the to-be-retrieved document when the to-be-retrieved document is not within the documents;

computing, according to the other probability that the word related to the topic appears, another probability that the topic appears in the to-be-retrieved document; and computing another similarity between the to-be-retrieved document and any corresponding document according to the probability that the topic appears in the to-be-retrieved document, another probability that the topic appears in the corresponding document, and another matching weight of the topic for another field to which the to-be-retrieved document belongs and for another field to which the corresponding document belongs.

5. The method of claim 4, wherein after computing the other similarity between the to-be-retrieved document and any corresponding document according to the probability that the topic appears in the to-be-retrieved document, the other probability that the topic appears in the corresponding document, and the other matching weight of the topic for the other field to which the to-be-retrieved document belongs and for the other field to which the corresponding document belongs, the method further comprises:

performing similarity sorting on the similarities between the to-be-retrieved document and the corresponding documents according to the similarities in descending order;

selecting, starting from the highest similarity in the similarity sorting list, the similarity greater than or equal to the preset threshold as the similarity between the to-be-retrieved document and the corresponding documents matching the to-be-retrieved document;

storing the similarity to the list of similarities between the to-be-retrieved document and the corresponding documents matching the to-be-retrieved document; and outputting, according to the list of similarities between the to-be-retrieved document and the corresponding documents matching the to-be-retrieved document, the document list of the corresponding documents matching the to-be-retrieved document.

6. An apparatus for computing a similarity between cross-field documents, comprising:

a memory; and a processor coupled to the memory and configured to:

store two documents having a plurality of fields;

store a relationship between the documents that is used to describe a determined matching relationship or an undetermined matching relationship between the documents, the determined matching relationship comprising a known matching relationship or a known non-matching relationship;

perform word segmentation and stop word removal on the documents to obtain vocabulary data packages corresponding to the documents;

store together the vocabulary data packages to obtain a vocabulary data set for each of the documents;

construct an incidence matrix between the documents according to the stored relationship, between the documents;

obtain a topic cluster of each of the documents according to the vocabulary data set;

obtain a probability that any topic in the topic cluster appears in one of the documents and a matching weight of the topic for any two different fields according to the incidence matrix and the topic cluster;

multiply the probability that the topic in the topic cluster appears in the documents to obtain a probability product;

multiply the probability product by the matching weight of the topic for the fields to which the documents belong to obtain the similarity between the documents with respect to the topic;

add up obtained similarities, between the documents with respect to topics in the topic cluster to obtain an initial similarity between the documents; and perform normalization processing on the initial similarity between the documents to obtain the similarity between the documents.

7. The apparatus claim 6, wherein the processor is further configured to:

perform similarity sorting on the similarities, between the documents and corresponding documents according to the similarities in descending order, a second field of the corresponding documents being different from the fields in the documents;

select, starting from a highest similarity in a similarity sorting list sorted, a similarity greater than or equal to a preset threshold as the similarity between the documents and the corresponding documents matching the document; and store the similarity to a list of similarities between the documents and the corresponding documents matching the document.

8. The apparatus of claim 7, wherein the processor is further configured to:

detect a to-be-retrieved document input by a user;

determine whether the to-be-retrieved document is within the stored documents;

query the lists of similarities for the list of similarities between the to-be-retrieved document and the corresponding documents matching the to-be-retrieved document when the to-be-retrieved document is within the stored documents; and output, according to the list of similarities, between the to-be-retrieved document and the corresponding documents matching the to-be-retrieved document, a document list of the corresponding documents matching the to-be-retrieved document.

9. The apparatus of claim 8, wherein the processor is further configured to:

count another probability that a word related to the topic in the topic cluster appears in the to-be-retrieved document when the to-be-retrieved document is not within the stored documents;

compute, according to the other probability that the word related to the topic appears, another probability that the topic appears in the to-be-retrieved document; and compute another similarity between the to-be-retrieved document and any corresponding document according to the probability that the topic appears in the to-beretrieved document, another probability that the topic appears in the document, and another matching weight, of the topic for another field to which the to-be-retrieved document belongs and for another field to which the corresponding document belongs.

10. The apparatus of claim 9, wherein the processor is further configured to:
perform similarity sorting on the similarities, between the to-be-retrieved document and the corresponding documents according to the similarities in descending order;
select, starting from the highest similarity in the similarity sorting list, the similarity greater than or equal to the preset threshold as the similarity between the to-be-retrieved document and the corresponding documents matching the to-be-retrieved document;
store the similarity to the list of similarities between the to-be-retrieved document and the corresponding documents matching the to-be-retrieved document; and
output, according to the list of similarities, between the to-be-retrieved document and the corresponding documents matching the to-be-retrieved document, the document list of the corresponding documents matching the to-be-retrieved document.

11. An apparatus for computing a similarity between cross-field documents, comprising:
an input apparatus;
an output apparatus; and
a processor coupled to the input apparatus and the output apparatus, the processor being configured to:
store two documents having a plurality of fields;
store a relationship between the documents that is used to describe a determined matching relationship or an undetermined matching relationship between the documents, the determined matching relationship comprising a known matching relationship or a known non-matching relationship;
perform word segmentation and stop word removal on the stored documents to obtain vocabulary data packages corresponding to the documents;
store together the vocabulary data packages together to obtain a vocabulary data set for each of the documents;
construct an incidence matrix between the documents according to the relationship between the documents;
obtain a topic cluster of each of the documents according to the vocabulary data set;
obtain a probability that any topic in the topic cluster appears in one of the documents and a matching weight of the topic for any two different fields according to the incidence matrix and the topic cluster;
multiply the probability that the topic in the topic cluster appears in the documents to obtain a probability product;
multiply the probability product by the matching weight of the topic for the fields to which the documents belong to obtain the similarity between the documents with respect to the topic;
add up similarities between the documents with respect to topics in the topic cluster to obtain an initial similarity between the documents; and
perform normalization processing on the initial similarity between the documents to obtain the similarity between the documents.

12. The apparatus of claim 11, wherein after computing the other similarity of the documents according to the probability that the topic in the topic cluster appears in the documents and the matching weight of the topic for the fields to which the documents belong, the processor further performs the following operations:
perform similarity sorting on similarities between the documents and corresponding documents according to the similarities in descending order, a second field of the corresponding documents being different from the fields in the documents;
select, starting from a highest similarity in a similarity sorting list, the similarity greater than or equal to a preset threshold as a similarity between the documents and the corresponding documents matching the document; and
store the similarity to a list of similarities between the documents and the corresponding documents matching the document.

13. The apparatus of claim 12, wherein after storing the similarity to the list of similarities between the documents and the corresponding documents matching the document, the processor further performs the following operations:
detect a to-be-retrieved document input by a user;
determine whether the to-be-retrieved document is within the documents;
query the list of similarities for the list of similarities between the to-be-retrieved document and the corresponding documents matching the to-be-retrieved document when the to-be-retrieved document is within the documents; and
output, according to the list of similarities between the to-be-retrieved document and the corresponding documents matching the to-be-retrieved document, a document list of the corresponding documents matching the to-be-retrieved document.

14. The apparatus of claim 13, wherein the processor further performs the following operations:
count another probability that a word related to the topic in the topic cluster appears in the to-be-retrieved document when the to-be-retrieved document is not within the documents;
compute, according to the other probability that the word related to the topic appears, another probability that the topic appears in the to-be-retrieved document; and
compute another similarity between the to-be-retrieved document and any corresponding document according to the probability that the topic appears in the to-be-retrieved document, another probability that the topic appears in the corresponding document, and another matching weight of the topic for another field to which the to-be-retrieved document belongs and for another field to which the corresponding document belongs.

15. The apparatus of claim 14, wherein after computing the other similarity between the to-be-retrieved document and any corresponding document according to the probability that the topic appears in the to-be-retrieved document, the other probability that the topic appears in any corresponding document, and the other matching weight of the topic for the other field to which the to-be-retrieved document belongs and for the other field to which the corresponding document belongs, the processor further performs the following operations:
perform similarity sorting on the similarities between the to-be-retrieved document and the corresponding documents according to the similarities in descending order;
select, starting from the highest similarity in the similarity sorting list, the similarity greater than or equal to the preset threshold as the similarity between the to-beretrieved document and the corresponding documents matching the to-be-retrieved document;

store the similarity to the list of similarities between the to-be-retrieved document and the corresponding documents matching the to-be-retrieved document; and output, according to the list of similarities between the to-be-retrieved document and the corresponding documents matching the to-be-retrieved document, the document list of the corresponding documents matching the to-be-retrieved document.

* * * * *